June 21, 1955  O. B. SALSBERG  2,711,199
DRILL EXTENSION
Filed June 13, 1952
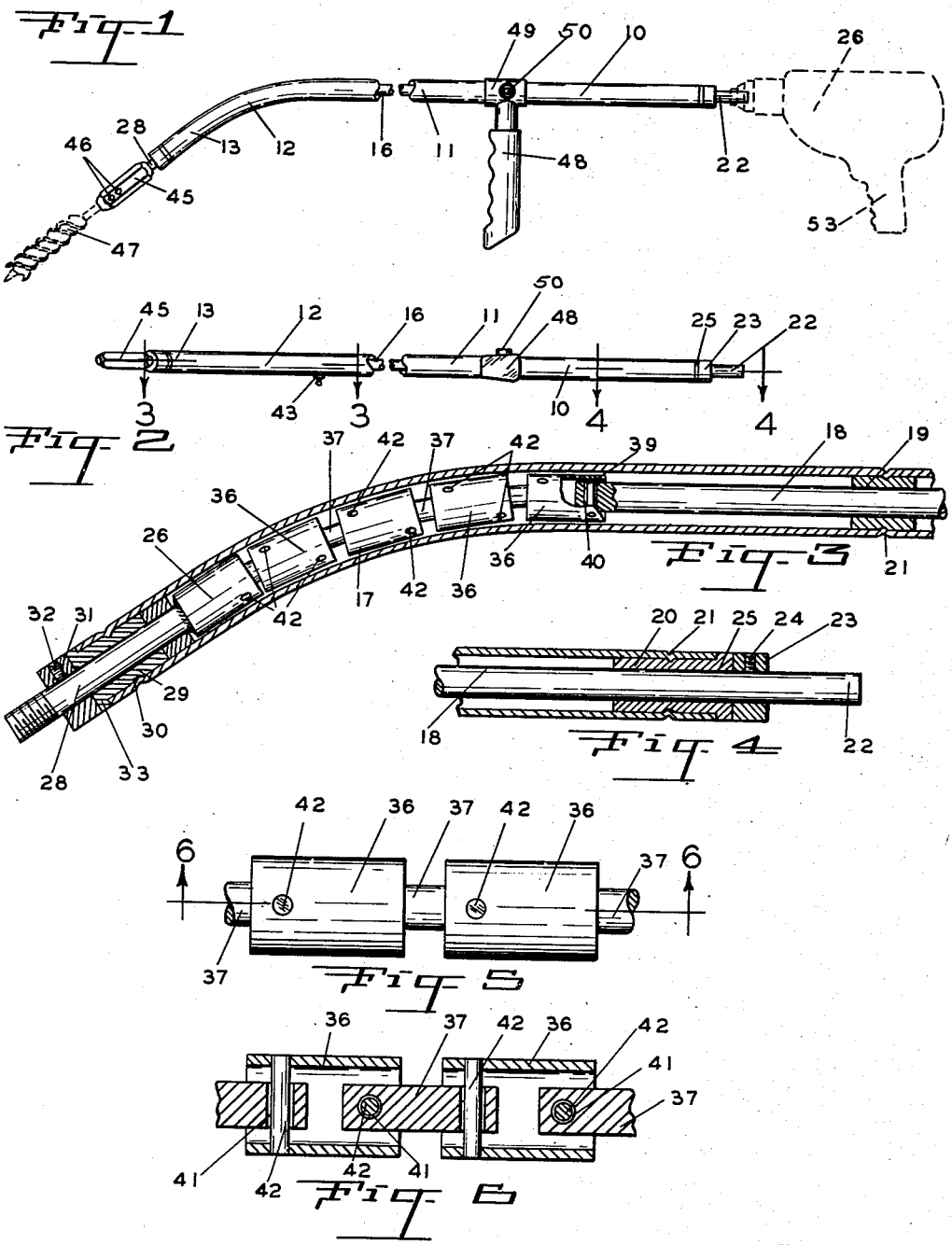
INVENTOR.
OSCAR B. SALSBERG
BY
Buckhorn and Cheatham
ATTORNEYS United States Patent Office 2,711,199
Patented June 21, 1955

2,711,199
DRILL EXTENSION
Oscar B. Salsberg, Springfield, Oreg.
Application June 13, 1952, Serial No. 293,414
1 Claim. (Cl. 144—104)

The present invention relates to a new and improved tool and, more particularly, to an extension device for use with a bit rotating implement such as a power drill.

The usual procedure in constructing a house or other wood frame building is to first put up the framework, rough siding and flooring, after which the plumbing and electrical wiring are installed. In performing their work, it is frequently necessary for the plumbers or electricians to pass pipes or electrical conduits through the floor joists, requiring them to drill holes therefor through the joists. With the rough flooring in place, workmen must work from the floor below, and if the holes are being bored with ordinary hand tools must use a ladder or temporary scaffolding to reach the work area. This, of course, creates an inherently unsafe working condition and, furthermore, as will be apparent, because of the working position and confined area between the joists, it is extremely difficult to manoeuvre a power drill or hand brace to drill the holes. On other occasions the holes for conduits or pipes must be drilled through the sills between closely spaced studdings which prevent the use of ordinary hand or power drills since they cannot be placed directly in line, as necessary, with the hole to be drilled.

It is an object, then, of the present invention to provide a new and improved tool with which work may be performed with increased safety.

A further object of the present invention is to provide a tool with which work may be performed with greater speed and ease.

Another object of the present invention is to provide a drill extension for use with power drills for drilling holes in places not easily accessible with ordinary tools.

More particularly, it is an object of the present invention to provide a drill extension for use with power drills which is rugged and easy to manipulate and which may be inexpensively manufactured.

Other objects and advantages will appear hereinafter.

In accordance with the illustrated embodiment, the drill bit extension device of the present invention includes a rigid, tubular housing member enclosing a rotatably mounted drive shaft, one end of which is adapted to be engaged in the chuck of the power drill and the other end of which carries a chuck in which may be mounted the shank of a drill bit. The housing member includes an elongated shank portion and a forward end portion which extends forwardly at an acute angle from the shank portion so as to permit the operator to place himself at a distance from the place to be worked and yet conveniently hold the drill bit in the desired alignment.

A more complete description of the invention is incorporated in the following specification taken in conjunction with the accompanying drawing wherein:

Fig. 1 is a side elevation of the extension device of the invention showing the attachment of a drill motor and a wood bit thereto;

Fig. 2 is a bottom plan view of the device;

Fig. 3 is a cross-sectional view along line 3—3 of Fig. 2;

Fig. 4 is a cross-sectional view along line 4—4 of Fig. 2;

Fig. 5 is a view of a detail of the device; and

Fig. 6 is a cross-sectional view along line 6—6 of Fig. 5.

The extension device of the invention comprises a rigid, tubular housing or body member 10 having a substantially straight, elongated rearward shank portion 11, a smoothly curved intermediate portion 12, and a relatively short, straight, forward end portion 13 extending outwardly and forwardly of the shank portion 11 at an acute angle preferably of between 35° and 40° in respect to the axis of the shank portion 11 to provide a tool having the greatest convenience in use. Rotatably mounted within the housing 10, and projecting outwardly from each of the opposite ends thereof, is a flexible drive shaft indicated generally at 16 and including a flexibly-articulated section 17 disposed within the intermediate curved portion 12 of the housing 10, and a rigid section or rod 18 extending through the shank portion 11 of the housing 10 and rearwardly therefrom as indicated at 22. The rearwardly extending part 22 of the drive shaft 16 is adapted for attachment to the chuck of a power driven hand drill 26, as shown in Fig. 1. The rod 18 is supported in axially centered relation in respect to the housing 10 by suitable bearings such as, for example, an annular horn fibre bearing member 19 (Fig. 3) mounted in the shank portion 11 a short distance from the curved portion 12 and an annular horn fibre bearing 20 (Fig. 4) mounted at the rearward end of the shank portion 11. To retain the bearings 19 and 20 in position, the housing 10 is rolled intermediate the ends of each of the bearings to form a pair of inwardly projecting ribs 21 which engage the outer surface of the corresponding bearing and prevent longitudinal shifting thereof. Mounted on the outwardly extending part 22 of the rod 18 adjacent the end of the shank portion 11 is a collar 23 secured to the rod by suitable means such as a setscrew 24. The bearing 20 is provided with an outwardly extending flange 25 which extends between the collar 23 and the end of the housing shank portion 11 to act as a thrust bearing therebetween.

Secured to the forward end of the articulated drive shaft section 17 is a chuck mounting section including the tubular rearward portion 26 and a straight, rodlike chuck adapter 28 extending outwardly of the forward end 13 of the housing 10 and rotatably supported therein in axially centered relation by an annular bearing member 29 retained in position by the inwardly projecting rib 30 of the wall of the end portion 13. Mounted on the chuck adapter 28 adjacent the end of the housing 10 is a collar 31 secured by a setscrew 32, the bearing member 29 having an outwardly projecting flange 33 acting as a thrust bearing for the collar 31. It will be apparent that the collar 23 and the collar 31 coact to retain the drive shaft 16 in position in the housing 10.

The articulated portion 17 of the drive shaft 16 is essentially a plurality of universal joints formed of cooperatively connected, alternate, tubular female members 36 and male members 37. The rod 18 is drivingly connected to a female member 36 at one end of the articulated portion 17 by a pin 39 which is secured at its opposite ends to the walls of the female member 36 and extends diametrically thereacross and through an enlarged opening 40 through the rod 18 near the end thereof. Each of the male members 37 is loosely connected at its opposite ends to the corresponding female member by a similar connection, the male members 37 having openings 41 at the opposite ends of each at right angles to one another and the female members 36 having pins 42 extending diametrically thereacross at the opposite ends of each and at right angles to one another and through an opening 41. The loose connections thus effected permit the articulated section 17 to rotate freely in the curved portion 12 of the housing 10. To minimize friction during operation of the device, the housing 10 is preferably packed with a suitable grease, and a nipple 43 is provided on the shank portion 11 between the annular bearing 19 and the first female member 36 of the articulated shaft portion 17 for adding additional grease as may be necessary.

Any suitable sort of chuck means, such as, for example, a Jacobs chuck, can be mounted on the chuck adapter, but preferably the chuck is one having an outer diameter substantially the same as that of the housing 10 so that the chuck and the housing may be pushed through a bored hole of larger diameter than the housing 10 if such action is necessary in the course of the work being performed. Such a chuck is indicated at 45 and comprises a hexagonal, tubular body member internally threaded at one end to receive the cooperative threads of the chuck adapter 28 and provided with a pair of setscrews 46 at the other end to lock the shank of a bit 47 thrust therein.

To facilitate manipulation of the device a handle is provided attached to an intermediate part of the housing shank portion 11, which handle may comprise a short rod 48 extending at right angles to the shank portion 11 and welded to a collar 49 which is fitted around the shank portion 11 and secured thereto by a setscrew 50 or other suitable means. In operation of the device the handle 53 of the drill motor 26 is grasped in one hand and the handle 48 of the device in the other to direct the drilling operations.

The device of the invention promotes safety inasmuch as a workman may stand on the floor of a building and drill holes in the joists of the flooring above, and at the same time he is displaced to one side away from the sawdust or chips falling from the hole being drilled.

Furthermore, the housing is rigid and the operator may firmly hold a drill on the desired location to drill a hole quickly and cleanly. It is also possible to drill holes in very closely confined areas such as through sills between closely spaced studdings inasmuch as only the drill bit itself and the forward part of the housing need be inserted directly in line with the hole to be drilled, the remainder of the apparatus being disposed angularly outwardly therefrom.

Having fully illustrated and described a preferred embodiment of the present invention, it should be apparent to those skilled in the art that the same permits of modification in arrangement and detail. I claim as my invention all such modifications as come within the true spirit and scope of the appended claim.

I claim:

A drilling attachment for use with a portable power drill, comprising a rigid, tubular housing member having an elongated, straight shank portion, a relatively short end portion extending forwardly and angularly of said shank portion, and a smoothly curved intermediate portion disposed between said shank and end portions, a drive shaft in said housing and including a relatively rigid section extending through said shank portion, a pair of annular bearing members disposed one adjacent each of the opposite ends of said shank portion and supporting said rigid section in axially centered relation therein, a flexibly-articulated drive shaft section connected at one end to said rigid section and extending through said intermediate housing portion, a chuck adapter connected to the opposite end of said articulated section and extending through said housing end portion and outwardly therefrom, an annular bearing member disposed within said forward end portion and rotatably supporting said chuck adapter in axially centered relation therein, said drive shaft extending rearwardly of said housing member and being adapted to be connected to a power drill and to be rotated thereby, a pair of annular collar members mounted one on the protruding end of said drive shaft and the other on the protruding portion of said chuck adapter closely adjacent the corresponding ends of said housing member to secure said shaft and chuck adapter against relative longitudinal movement relative to said housing member, each of the bearing members adjacent the end of said housing member having a flange extending between the corresponding collar and housing end to provide a thrust bearing therebetween.

References Cited in the file of this patent

UNITED STATES PATENTS

| | | |
|---|---|---|
| 1,091,511 | Hays | Mar. 31, 1914 |
| 1,297,034 | Strand | Mar. 11, 1919 |
| 1,315,806 | Wilson | Sept. 9, 1919 |
| 1,408,802 | Crocker | Mar. 7, 1922 |
| 1,866,714 | King | July 12, 1932 |
| 1,912,658 | Schulse | June 6, 1933 |
| 2,291,729 | Koett | Aug. 4, 1942 |
| 2,357,773 | Sheskier | Sept. 5, 1944 |
| 2,501,217 | Hawn | Mar. 21, 1950 |
| 2,571,589 | Lindell | Oct. 16, 1951 |